United States Patent
Henry

(10) Patent No.: US 7,128,217 B2
(45) Date of Patent: Oct. 31, 2006

(54) BUN LANER

(75) Inventor: James T. Henry, Greenville, TX (US)

(73) Assignee: The Henry Group, Inc., Greenville, TX (US)

( * ) Notice: Subject to any disclaimer, the term of this patent is extended or adjusted under 35 U.S.C. 154(b) by 161 days.

(21) Appl. No.: 10/916,338

(22) Filed: Aug. 11, 2004

(65) Prior Publication Data

US 2006/0070927 A1    Apr. 6, 2006

(51) Int. Cl.
- B07C 5/00    (2006.01)
- B65G 47/26    (2006.01)
- B65G 47/12    (2006.01)

(52) U.S. Cl. ............ 209/643; 209/656; 209/539; 209/905; 198/443; 198/418.7; 198/453; 53/448

(58) Field of Classification Search ............ 198/443, 198/445, 437; 209/643, 656, 657, 539
See application file for complete search history.

(56) References Cited

U.S. PATENT DOCUMENTS

| | | | | |
|---|---|---|---|---|
| 2,679,309 A | * | 5/1954 | Reading | 198/446 |
| 2,949,179 A | * | 8/1960 | Busse | 198/418.1 |
| 3,375,917 A | * | 4/1968 | Irving, Jr. | 198/689.1 |
| 3,580,640 A | * | 5/1971 | Eriksson | 406/19 |
| 3,612,299 A | * | 10/1971 | Shaw et al. | 414/791.7 |
| 3,741,368 A | * | 6/1973 | Burkholder | 198/418.1 |
| 4,042,100 A | * | 8/1977 | Morrone | 198/446 |
| 4,086,998 A | * | 5/1978 | van der Schoot | 198/358 |
| 4,173,276 A | * | 11/1979 | Raudat et al. | 198/437 |
| 4,932,514 A | * | 6/1990 | Doppenberg | 198/445 |
| 5,048,696 A | * | 9/1991 | Evans | 209/552 |
| 5,768,860 A | * | 6/1998 | Weaver | 53/543 |
| 5,937,995 A | * | 8/1999 | Hartness et al. | 198/445 |
| 6,000,526 A | * | 12/1999 | van Veldhuisen et al. | 198/446 |
| 6,776,278 B1 | * | 8/2004 | Gross et al. | 198/416 |
| 6,811,017 B1 | * | 11/2004 | Gross et al. | 198/453 |
| 2006/0021852 A1 | * | 2/2006 | Cull et al. | 198/445 |

* cited by examiner

Primary Examiner—Kathy Matecki
Assistant Examiner—Jonathan R Miller
(74) Attorney, Agent, or Firm—Anderson, Levine & Lintel

(57) ABSTRACT

A bun laner sorts buns into a predetermined number of lanes, for providing buns to a packaging unit. The bun laner detects when some lanes are filling faster than other and closes those lanes while the other lanes fill. A vacuum may be used to hold buns in a filled lane in order to close the lane. An optical detection unit may be used to determine when a bun has been stationary at a certain position in the lane for a predetermined amount of time.

11 Claims, 3 Drawing Sheets

BUN LANER

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to food packaging equipment and, more particularly, to equipment for sorting buns into lanes.

2. Description of the Related Art

Commercial bakeries use high-speed packaging equipment to bag hamburger rolls, hot dog rolls, and other bread products (collectively, "buns"). Typically, the buns are packaged in arrays of one or more layers; for example, a sixteen bun package may package the buns in a four-by-four array and a 32 bun package may package the buns in two four-by-four layers.

In order to arrange the rolls in an array, a bun laner is used. The bun laner takes randomly arranged buns on a conveyer and aligns the buns into rows or "lanes". When a sufficient number of buns are in each lane, a group is transported to a packaging machine.

Unfortunately, the randomly arranged buns do not evenly fill the lanes under normal circumstances. If a certain lane is not being filled as quickly as the other lanes, then the packaging machine must wait, slowing the packing process. Accordingly, the bun laner generally requires human intervention to direct the buns to the lanes evenly. Manual supervision of the machines, of course, increases the cost of packaging the buns and wastes human resources on a tedious chore.

Therefore, a need has arisen for a bun laner that does not require human supervision.

BRIEF SUMMARY OF THE INVENTION

In the present invention, a bun laner comprises a staging area for holding a plurality of buns and a predetermined number of lanes into which buns from the staging area are sorted. A bun detection unit detects each lane that has at least a predetermined number of buns and, responsive to a detection, a vacuum selectively closing one or more of the lanes.

The present invention provides significant advantages over the prior art. First, full lanes can be blocked using an uncomplicated vacuum mechanism. Second, the lanes are blocked without causing damage to the buns.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–4 of the drawings, like numerals being used for like elements of the various drawings.

Figure 1:
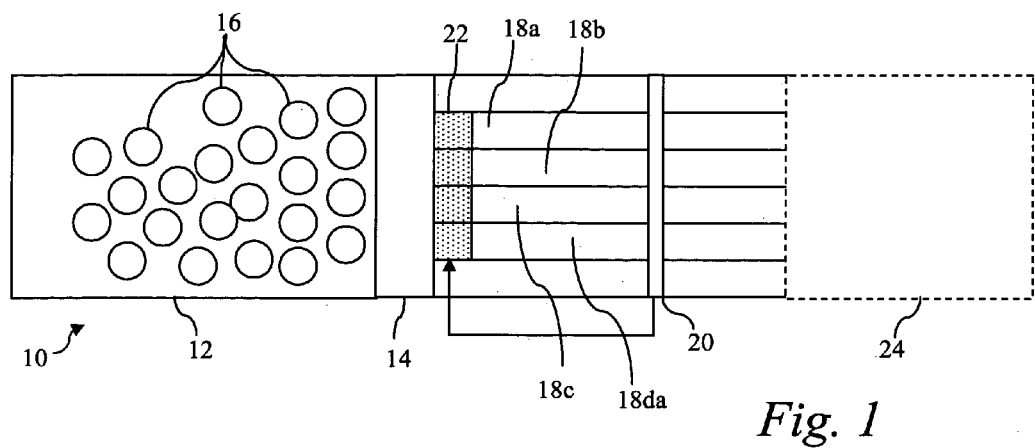
FIG. 1 illustrates a general block diagram of a bun laner.

FIG. 1 illustrates a basic diagram of a bun laner 10. Buns enter the laner 10 in staging area 12 after cooling an de-panning. Sorting mechanism 14 aids in directing buns 16 from the staging area 12 into one of the lanes 18. Bun detection unit 20 detects when the number of buns in a lane have reached a predetermined point in the lane. Lane impeder 22 can impede bun movement into one or more selected lanes, responsive to a signal from bun detection unit 20. A packaging device 24 receives buns from the lanes 18*a*–*d* and packages the buns 16.

Figure 2:
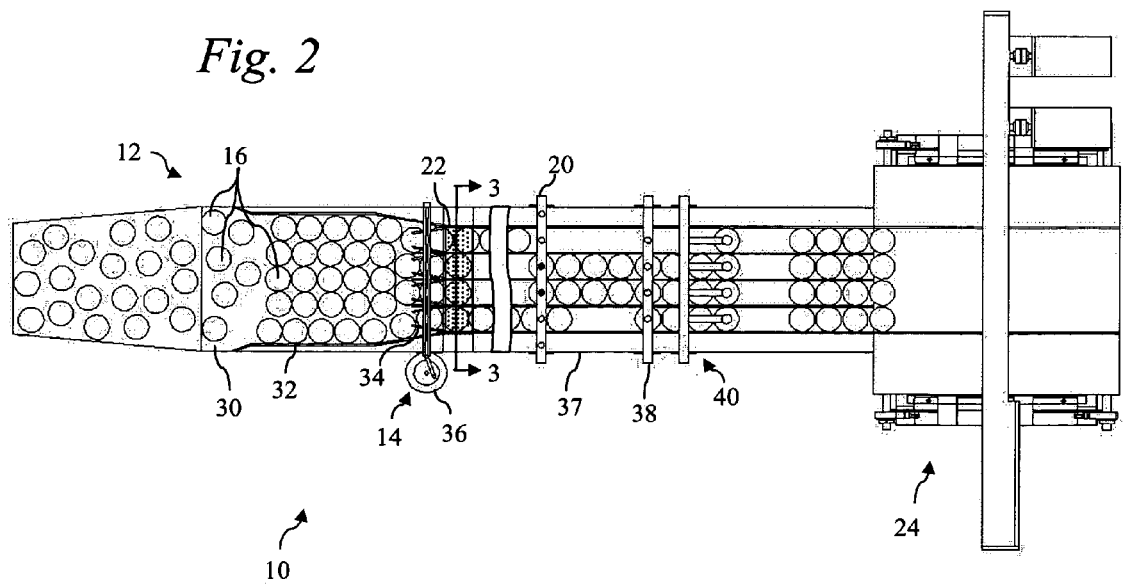
FIG. 2 illustrates a detailed top view of a bun laner.
Figure 3:
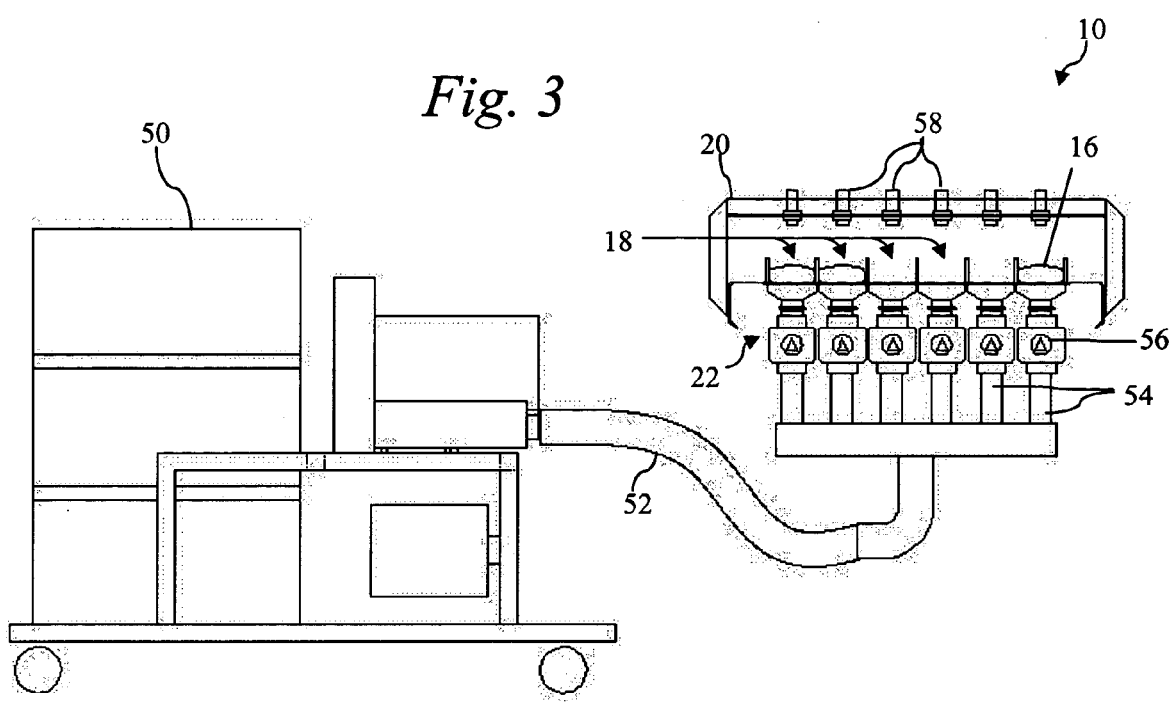
FIG. 3 illustrates a front view of a vacuum unit in conjunction with a front cross-sectional view of the bun laner.
Figure 4:
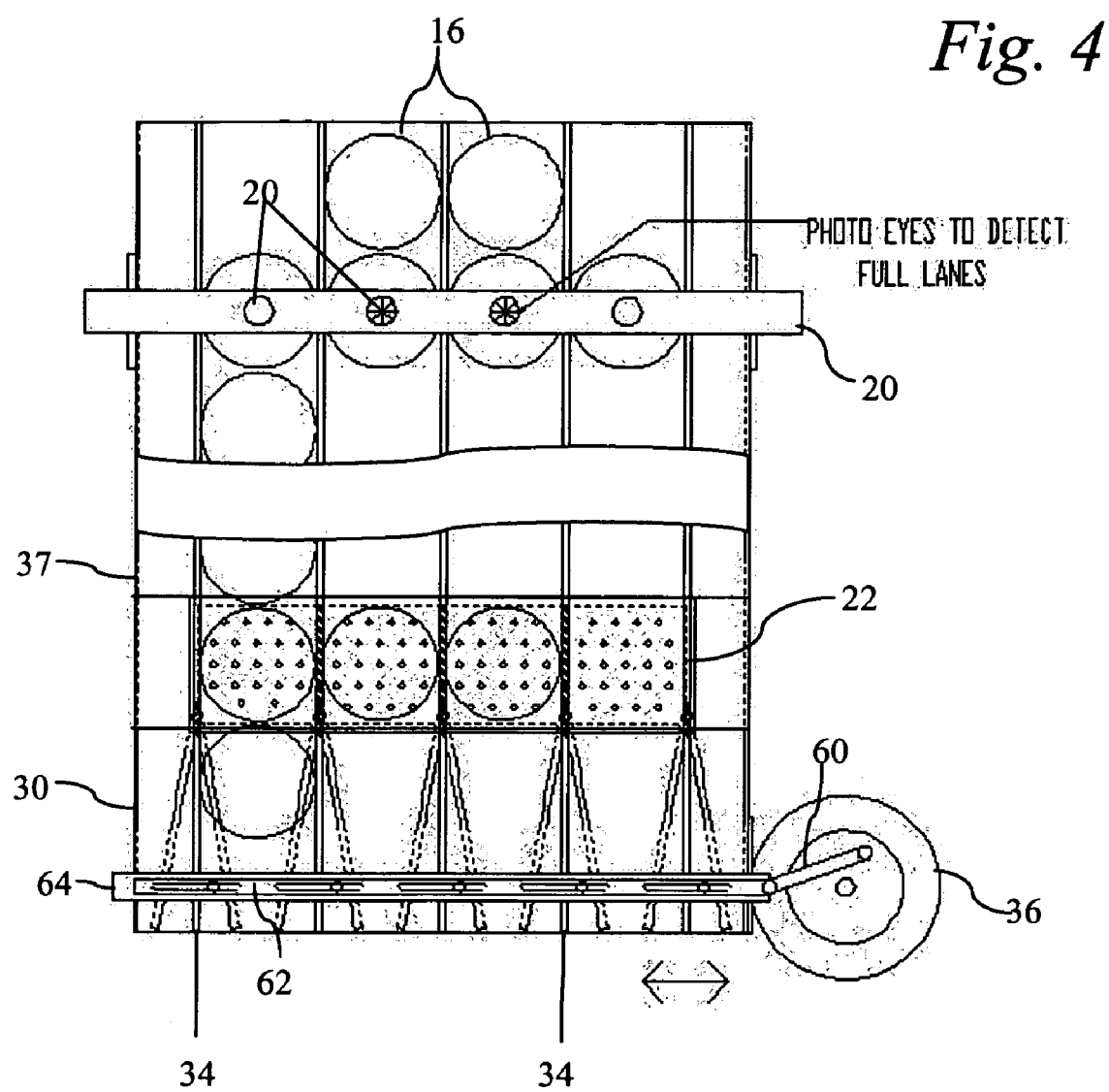
FIG. 4 illustrates a top view of a lane impeder unit.

In operation, the staging area 16 includes a conveyor belt which transports the buns towards the sorting mechanism 14. The sorting mechanism could use, for example, moving guides as shown in FIGS. 2–4. The purpose of the sorting mechanism is to direct randomly placed buns 16 into a lane 18. Bun detection unit 20 could be implemented using an optical detector which senses the presence of a bun for a predetermined time (such as two seconds) or other optical, electrical, mechanical or electromechanical device which senses the presence of a bun for a predetermined amount of time or otherwise senses the non-movement of a bun. The purpose of the bun detection unit 20 is to signal the lane impeder whenever buns in a lane 18 have reached a certain point in the lane. Under control of the bun detection unit 20, the lane impeder 22 temporarily stops buns from entering the filled lane(s). By impeding buns in one or more lanes, the remaining buns in the staging area 12 will be forced to enter an unfilled lane 18. The lane impeder 22 selectively provides a vacuum at the bottom of the filled lanes, as shown in greater detail in connection with FIG. 3.

For purposes of illustration, the lane impeder 22 is shown close to the bun detector 20; however, in an actual implementation, there would be several feet between these two units. Accordingly, by the time a filled lane is detected, there are likely to be additional buns behind the bun directly beneath the bun detector.

To illustrate the benefits of the bun laner 10 of FIG. 1, it is assumed that the packaging device 24 is bagging buns in an array of 4×4, although any size array (or multiple arrays, such as a stack of two 4×4 arrays) could be accommodated by the bun laner 10. In the case of a 4×4 array, the packaging device 24 cannot receive buns 16 from the laner 10 until each of the four lanes 18*a*–*d* hold at least four buns. If, for example, the middle lanes 18*b*–*c* are filling faster than the outside lanes 18*a* and 18*d*, the packaging device 24 will be delayed in its operation. In the present invention, once a predetermined number of buns are in a lane 18 (for example, twelve buns), that lane will be impeded by lane impeder 22, which prevents further buns from entering the impeded lane(s). Hence, in this example, as soon as lane detector 20 detects twelve buns in lane 18*b*, a vacuum is applied to that lane and further buns are stopped at the sorting mechanism 14. The buns 16 in the staging area 12 will thus be directed to the other lanes. When there are enough buns 16 in lanes 18 for packaging, the buns 16 will be released to the packaging device 24; the release of the buns may or may not cause the impeded lanes to be re-opened, depending upon the number of buns behind the bun detection unit 20 at the time that the lane was closed.

Accordingly, with the lane impeder 22 controlled responsive to detection by the bun detection unit 20, buns 16 are directed to under-filled lanes without human intervention.

FIG. 2 illustrates a more detailed top view of the bun laner 10 (in conjunction with the packaging device 24. In staging area 12, a first conveyor belt 30 transports buns 16 to the sorting mechanism 14. Barriers 32 funnel the buns from to the center of the conveyor belt 30, towards the lanes 18a–d. The sorting mechanism 14, shown in greater detail in connection with FIG. 4, has five guides 34 which oscillate back and forth (in parallel) to align the buns 16 with the lanes 18. Wheel 36 controls the movement of the guides 34 at it is rotated by a motor (not shown). Lane impeder 22 includes a perforated grate that is sloped slightly downward such that buns 16 slide over lane impeder 22 onto conveyor belt 37 when a vacuum is not being applied.

Once a bun has passed ever lane impeder 22, it is transported down its lane by conveyor belt 37. As the buns 16 are transported down a lane, they pass under bun detection unit 20. If the bun detection unit 20 senses that a bun directly below the detection unit 20 is stationary, the bun detection unit 20 sends a signal to the lane impeder 22 indicating that the lane is full. At this point, buns may have already passed by the lane impeder 22, so it is not necessarily the case that a bun underneath the bun detection unit is the last bun in the lane 18.

A second bun detection unit 38 detects when all of the lanes have a sufficient number of buns 16 for passing to the packaging device 24. Second bun detection unit 38 works in conjunction with bun holder 40 to release a predetermined number of buns from the laner 10 to the packaging device 24 and or a bun slicing device. The packaging device 24 may be of any standard design. Because the bun laner 10 provides a more even distribution of buns through the lanes, it may lessen the amount of pressure needed to mechanically hold a bun in place, since the necessary pressure is related to the number of buns in line being pushed forward by conveyor belt 37.

FIG. 3 illustrates the lane impeder 22 (for a six lane unit). A vacuum unit 50 provides suction through hose 52. The suction from hose 52 is diverted into six pipes 54, each having a respective valve 56. Each valve 56 is controlled by a respective sensor 58 on the detection unit 20. Each valve is coupled to its respective lane 18.

The valves 56 control whether a bun is allowed to pass or is held in place by the vacuum created by vacuum unit 50. When a valve 56 is open, the vacuum from vacuum unit 50 holds the bun over the valve in place.

By selectively applying a vacuum to full lanes, the buns are held in place without damage to the bun and without a complicated mechanical structure to selectively shut of lanes.

FIG. 4 illustrates detailed top view of the sorting mechanism 14. Wheel 36 is constantly rotated by a motor (not shown). A bar 60 has one end that is pivotally attached to the perimeter of wheel 36 and a second end which is pivotally coupled to sliding bar 62. Sliding bar 62 is slideably engaged in carrier 64. Responsive to the rotation of wheel 36, the sliding bar 62 move back and forth in carrier 64. Sliding bar 62 is coupled to the guides 34, such that as sliding bar 62 oscillates back and forth, guides 34 oscillate back and forth as well.

In an alternative embodiment, a vibratory conveyor is used in the staging area 12 in place of conveyor belt 30 and sorting mechanism 22. A vibratory conveyor is generally made of a smooth metal, such as stainless steel, and vibrates to move the food product, i.e., the buns 16, forward towards the lanes. Because the staging area 12 with a metal surface is much smoother than a conveyor belt, there is less friction with the buns in staging area 12, and the buns freely move around one another when one or more lanes are impeded by the vacuum.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A bun laner comprising:
   a staging area for holding a plurality of buns;
   a predetermined number of lanes into which buns from the staging area are channeled;
   a bun detection unit for detecting each lane having at least a predetermined number of buns; and
   vacuum means for selectively closing one or more of the lanes responsive to the bun detection unit.

2. The bun laner of claim 1 wherein the bun detection unit comprises optical sensors for respective lanes.

3. The bun laner of claim 2 wherein said vacuum means includes valves controlled by the optical sensors.

4. The bun laner of claim 1 and further comprising a plurality of oscillating guides for directing buns into a lane.

5. The bun laner of claim 1 and further comprising wherein the staging area includes a vibratory conveyor.

6. The bun laner of claim 1 wherein the vacuum means includes a sloping grate.

7. A method of channeling buns into a plurality of lanes comprising the steps of:
   transferring a plurality of buns into a staging area;
   transporting the buns towards the lanes;
   detecting each lane having at least a predetermined number of buns; and
   selectively applying a vacuum to one or more of the lanes responsive to the detecting step.

8. The method of claim 7 wherein the detecting step comprises the step of detecting stationary a stationary bun at a predetermined location in a lane using an optical sensors.

9. The method of claim 8 said selectively applying a vacuum step comprises enabling valves responsive to the optical sensors.

10. The method of claim 7 and further comprising the step of directing buns into a lane using oscillating guides.

11. The method of claim 7 wherein said transporting step comprises the step of transporting the buns towards the lanes using a vibratory conveyor.

* * * * *